(12) United States Patent
Coulson et al.

(10) Patent No.: US 11,608,926 B2
(45) Date of Patent: Mar. 21, 2023

(54) LASER INDUCED SEALING OF CONCENTRICALLY LAYERED MATERIALS

(71) Applicant: WilMarc Holdings, LLC, Fort Collins, CO (US)

(72) Inventors: William A. Coulson, Fort Collins, CO (US); Marcia Coulson, Fort Collins, CO (US); Paul C. Ciccone, Wellington, CO (US)

(73) Assignee: Wilmarc Holdings, LLC, Fort Collins, CO (US)

( * ) Notice: Subject to any disclaimer, the term of this patent is extended or adjusted under 35 U.S.C. 154(b) by 0 days.

(21) Appl. No.: 16/945,036

(22) Filed: Jul. 31, 2020

(65) Prior Publication Data

US 2020/0363002 A1    Nov. 19, 2020

Related U.S. Application Data

(63) Continuation of application No. 15/376,390, filed on Dec. 12, 2016, now Pat. No. 10,794,523.

(Continued)

(51) Int. Cl.
*F16L 47/02* (2006.01)
*B29C 65/00* (2006.01)
(Continued)

(52) U.S. Cl.
CPC .............. *F16L 47/02* (2013.01); *B29C 65/16* (2013.01); *B29C 65/1635* (2013.01);
(Continued)

(58) Field of Classification Search
CPC . B29C 65/16; B29C 65/1635; B29C 65/1654; B29C 65/1687; B29C 66/1122;
(Continued)

(56) References Cited

U.S. PATENT DOCUMENTS 2,345,037 A    3/1944  De Gray
2,763,057 A    9/1956  Clair, Jr.
(Continued)

FOREIGN PATENT DOCUMENTS

DE    202014100268 U1    6/2015
JP        H06510715        12/1994
(Continued)

OTHER PUBLICATIONS

U.S. Appl. No. 62/267,205, filed Dec. 14, 2015.
(Continued)

*Primary Examiner* — Philip C Tucker
*Assistant Examiner* — Brian R Slawski
(74) *Attorney, Agent, or Firm* — Craig R. Miles; CR Miles P.C.

(57) ABSTRACT

A connection, and methods of making an using such a connection, the connection comprising a first layer; a second layer concentrically disposed about the first layer; and a laser-induced seal between portions of the first and second layers; wherein the laser-induced seal provides a fluid-tight engagement between the first and second layers. As to particular embodiments of the connection, the first layer can be incorporated into a first conduit and the second layer can be incorporated into a second conduit.

16 Claims, 10 Drawing Sheets

Related U.S. Application Data (60) Provisional application No. 62/267,205, filed on Dec. 14, 2015.

(51) Int. Cl.

| | | |
|---|---|---|
| *B29C 65/16* | (2006.01) | |
| *B29L 31/24* | (2006.01) | |
| *B29K 105/00* | (2006.01) | |
| *B29L 9/00* | (2006.01) | |
| *B29L 23/00* | (2006.01) | |

(52) U.S. Cl.
CPC ...... *B29C 65/1654* (2013.01); *B29C 65/1687* (2013.01); *B29C 66/1122* (2013.01); *B29C 66/305* (2013.01); *B29C 66/5221* (2013.01); *B29C 66/5344* (2013.01); *B29C 66/65* (2013.01); *B29C 66/652* (2013.01); *B29C 66/712* (2013.01); *B29C 66/7332* (2013.01); *B29C 66/73921* (2013.01); *B29C 66/91218* (2013.01); *B29C 66/91221* (2013.01); *B29C 66/97* (2013.01); *B29C 66/98* (2013.01); *B29C 66/71* (2013.01); *B29C 66/939* (2013.01); *B29K 2105/258* (2013.01); *B29K 2995/002* (2013.01); *B29L 2009/00* (2013.01); *B29L 2023/00* (2013.01); *B29L 2031/24* (2013.01)

(58) Field of Classification Search
CPC .............. B29C 66/305; B29C 66/5221; B29C 66/5334; B29C 66/65; B29C 66/652; B29C 66/71; B29C 66/712; B29C 66/7332; B29C 66/73921; B29C 66/91218; B29C 66/91221; B29C 66/939; B29C 66/97; B29C 66/98; B29K 2105/258; B29K 2995/002; B29L 2009/00; B29L 2023/00; B29L 2031/24; F16L 47/02
USPC .......... 156/60, 272.2, 272.8, 293, 294, 296, 156/308.2, 308.4, 309.6; 138/118, 120, 138/155
See application file for complete search history.

(56) References Cited

U.S. PATENT DOCUMENTS

| | | | |
|---|---|---|---|
| 3,429,591 A | 2/1969 | Loyd et al. | |
| 3,473,833 A | 10/1969 | Bremer | |
| 4,733,692 A | 3/1988 | Kotake et al. | |
| 5,848,811 A | 12/1998 | Sampson | |
| 6,832,785 B1 | 12/2004 | Zitkovic, Jr. | |
| 8,038,178 B2 | 10/2011 | Badarinarayan et al. | |
| 10,794,523 B2 | 10/2020 | Coulson et al. | |
| 2002/0100540 A1* | 8/2002 | Savitski | B29C 66/1224 156/304.3 |
| 2002/0117561 A1 | 8/2002 | Shirai et al. | |
| 2003/0015284 A1* | 1/2003 | Merdan | A61L 31/14 427/496 |
| 2003/0141009 A1* | 7/2003 | Landherr | B29C 66/82263 156/380.7 |
| 2004/0140668 A1 | 7/2004 | Monsheimer et al. | |
| 2005/0127668 A1 | 6/2005 | Mobley et al. | |
| 2005/0251986 A1* | 11/2005 | Katayama | B29C 65/1654 29/458 |
| 2007/0151970 A1* | 7/2007 | Zento | B29C 66/1224 219/678 |
| 2007/0222213 A1 | 9/2007 | Andersen | |
| 2008/0187697 A1 | 8/2008 | Amano | |
| 2010/0001246 A1 | 1/2010 | Kay | |
| 2010/0096388 A1* | 4/2010 | Kobayashi | B29C 65/72 220/359.4 |
| 2011/0074145 A1* | 3/2011 | Schwarzkopf | B29C 66/1224 285/21.2 |
| 2011/0098660 A1* | 4/2011 | Porreca, Jr. | A61J 15/0069 604/246 |
| 2012/0143132 A1* | 6/2012 | Orlowski | A61L 29/16 604/103.02 |
| 2014/0035279 A1 | 2/2014 | Narayanan et al. | |
| 2014/0236102 A1* | 8/2014 | Matsumoto | A61M 5/344 604/272 |
| 2015/0145241 A1 | 5/2015 | Asami et al. | |
| 2015/0330541 A1 | 11/2015 | McCoy | |
| 2018/0272616 A1 | 9/2018 | Pionetti et al. | |

FOREIGN PATENT DOCUMENTS

| | | |
|---|---|---|
| JP | H0911332 | 1/1997 |
| JP | 3369000 | 1/2003 |
| JP | 2004-90628 A | 3/2004 |
| JP | 2004114456 A | 4/2004 |
| JP | 2005199667 | 7/2005 |
| JP | 2005305985 | 11/2005 |
| JP | 4113752 | 7/2008 |
| JP | 2009056722 | 3/2009 |
| JP | 2009-83406 A | 4/2009 |
| JP | 2010-501811 A | 1/2010 |
| JP | 2014-147962 A | 8/2014 |
| WO | WO 2005/063469 A1 | 7/2005 |

OTHER PUBLICATIONS

U.S. Appl. No. 15/376,390, filed Dec. 12, 2016.
U.S. Appl. No. 15/376,390, Office Action dated Apr. 25, 2019.
U.S. Appl. No. 15/376,390, Office Action dated Aug. 28, 2019.
U.S. Appl. No. 15/376,390, Office Action dated Jan. 28, 2020.
Corresponding European Patent application No. 16876481.9; Extended European Search Report dated Jul. 8, 2019, 8 pages.
Corresponding Australian Patent Application No. 2016370468, Examination Report No. 1, dated Aug. 24, 2021, 4 pages.
Corresponding Japanese Patent Application No. 2018-549417, Official Action, dated Feb. 11, 2021, 15 pages.
Corresponding Japanese Patent Application No. 2018-549417, Official Action, dated Oct. 26, 2021, 13 pages (with English translation).
Corresponding Mexican Patent Application No. MX/a/2018/007199, Official Action dated Apr. 27, 2022, 3 pages.
Corresponding Korean Patent Application No. 10-2018-7019764, Official Action dated May 13, 2022, 6 pages.

* cited by examiner

LASER INDUCED SEALING OF CONCENTRICALLY LAYERED MATERIALS

This United States Patent Application is a continuation of U.S. patent application Ser. No. 15/376,390, filed Dec. 12, 2016, now U.S. Pat. No. 10,794,523, which claims the benefit of U.S. Provisional Patent Application No. 62/267,205, filed Dec. 14, 2015, each hereby incorporated by reference herein.

SUMMARY OF THE INVENTION

A broad object of a particular embodiment of the invention can be to provide a connection, and methods of making an using such a connection, the connection comprising a first layer; a second layer concentrically disposed about the first layer; and a laser-induced seal between portions of the first and second layers; wherein the laser-induced seal provides a fluid-tight engagement between the first and second layers.

Another broad object of a particular embodiment of the invention can be to provide a connection, as described above, wherein the first layer is incorporated into a first conduit and the second layer is incorporated into a second conduit.

Naturally, further objects of the invention are disclosed throughout other areas of the specification, drawings, and claims.

DETAILED DESCRIPTION OF THE INVENTION

Now referring primarily to FIG. 1 through FIG. 7, which illustrate a particular embodiment of a connection (1) including a first layer (2), a second layer (3) concentrically disposed about the first layer (2), and a laser-induced seal (4) between portions of the first and second layers (2)(3), whereby the laser-induced seal (4) provides a fluid-tight engagement between the first and second layers (2)(3).

For the purposes of the present invention, the term "seal" means something that secures.

The first and second layers (2)(3) can each be formed from corresponding first and second materials (5)(6), whereby the first and second materials (5)(6) can be any of a numerous and wide variety of materials which upon exposure to a laser (7), can generate the laser-induced seal (4) between portions of the first and second layers (2)(3). As non-limiting examples, the first or second material (5)(6) can be a thermoplastic elastomer (TPE), polypropylene (PP), polypropylene (PP) derivatives, polyethylene (PE), polyethylene (PE) derivatives, polyolefin elastomer (POE), polyvinylidene fluoride (PVDF), polycarbonate (PC), acrylonitrile butadiene styrene (ABS), or the like, or combinations thereof.

As to particular embodiments, the first and second materials (5)(6) can be similar materials or the same material. As illustrative examples, the first and second materials (5)(6) can both be polypropylene (PP), polyethylene (PE), or polyvinylidene fluoride (PVDF).

As to other particular embodiments, the first and second materials (5)(6) can be dissimilar materials or different materials. As illustrative examples, the first and second materials (5)(6) can be: polyolefin elastomer (POE) and polypropylene (PP), respectively; polyolefin elastomer (POE) and polyethylene (PE), respectively; thermoplastic elastomer (TPE) and polypropylene (PP), respectively; or thermoplastic elastomer (TPE) and polyethylene (PE), respectively.

Now referring primarily to FIG. 1 through FIG. 13, the second layer (3) is concentrically disposed about the first layer (2) such that a portion of a first layer external surface (8) is adjacent to, directly adjacent to, or in contact with a portion of a second layer internal surface (9). Accordingly, upon exposure to a laser (7), the laser-induced seal (4) can be generated between at least the first layer external surface (8) and the second layer internal surface (9).

As to particular embodiments, the first and second layers (2)(3) can each be incorporated into corresponding first and second conduits (10)(11). Each of the conduits (10)(11) includes opposing conduit external and internal surfaces (12)(13)(14)(15), whereby each conduit internal surface (14)(15) defines a conduit passageway (16)(17) through which fluid can flow.

For the purposes of the present invention, the term "conduit" means a tubular member through which something can pass.

For the purposes of the present invention, the term "fluid" means flowable matter, which can include: a gas, a liquid, or the like, or combinations thereof.

The conduit external and internal surfaces (12)(13)(14)(15) can have any of a numerous and wide variety of configurations, including any of a numerous and wide variety of cross sections, depending upon the application. As non-limiting examples, the cross section of the conduit external or internal surface (12)(13)(14)(15) can be generally circular, elliptical, square, rectangular, polygonal, a freeform shape, or the like, or combinations thereof.

A conduit wall (18) disposes between the conduit external and internal surfaces (12)(13)(14)(15), whereby the conduit wall (18) can have any of a numerous and wide variety of conduit wall thicknesses (19). As a non-limiting example, the conduit wall thickness (19) can be in a range of between about 0.05 millimeters (about 0.002 inches) to about 13 millimeters (about 0.5 inches), although the conduit wall thickness (19) can be lesser or greater depending upon the application.

The conduit internal surface (14)(15) can define a conduit passageway (16)(17) having any of a numerous and wide variety of conduit passageway diameters (20). As a non-limiting example, the conduit passageway diameter (20) can be in a range of between about 0.2 millimeters (about 0.0073 inches) to about 100 millimeters (about 4 inches), although the conduit passageway diameter (20) can be lesser or greater depending upon the application.

Again referring primarily to FIG. 1 through FIG. 13, the connection (1) further includes a laser-induced seal (4) between portions of the first and second layers (2)(3), whereby the laser-induced seal (4) provides a fluid-tight engagement between the first and second layers (2)(3). Consequently, when the portions of the first and second layers (2)(3) are connected via the laser-induced seal (4) and thus, are in fluid-tight engagement with one another, fluid is precluded from traveling across the portions of the first and second layers (2)(3) proximate the laser-induced seal (4).

As to particular embodiments whereby the first and second layers (2)(3) are incorporated into corresponding first and second conduits (10)(11), when the first and second conduits (10)(11) are connected via the laser-induced seal (4) and thus, are in fluid-tight engagement with one another, the first and second conduit passageways (16)(17) together form a fluid flow path (21) through which fluid can flow without egressing from the passageways (16)(17), and particularly without egressing from the portions of the passageways (16)(17) proximate the laser-induced seal (4).

The laser-induced seal (4) can be generated by any of a numerous and wide variety of lasers (7), whereby a laser (7) is a device that produces a laser beam (22) which can generate a laser weld, such as a laser-induced seal (4).

To generate the laser-induced seal (4), the laser beam (22) can be focused in any of a numerous and wide variety of locations, typically but not necessarily between a second layer external surface (23) and a first layer internal surface (24). Accordingly, the laser-induced seal (4) can be generated in any of a numerous and wide variety of locations between the second layer external surface (23) and the first layer internal surface (24).

As to particular embodiments, the laser-induced seal (4) can span generally the entirety of the distance between the second layer external surface (23) and the first layer internal surface (24).

As to other particular embodiments, the laser-induced seal (4) can span a portion of the distance between the second layer external surface (23) and the first layer internal surface (24), for example a portion proximate the first layer external surface (8) and the second layer internal surface (9).

The laser beam (22) can have any power capable of generating a laser-induced seal (4). As but one illustrative example, the laser beam (22) can have power in a range of between about 10 Watts to about 120 Watts, although the power can be lesser or greater depending upon the application.

Additionally, the laser beam (22) can have any rate of travel capable of generating a laser-induced seal (4). As but one illustrative example, the laser beam (22) can have a rate of travel in a range of between about 0.13 millimeters (about 0.005 inches) per second to about 51 millimeters (about 2 inches) per second, although the rate of travel can be lesser or greater depending upon the application.

The laser-induced seal (4) generated by the laser beam (22) can have any of a numerous and wide variety of laser-induced seal widths (25), whereby the laser-induced seal width (25) is sufficient to allow the laser-induced seal (4) to provide a fluid-tight engagement between the first and second layers (2)(3). As but one illustrative example, the laser-induced seal width (25) can be in a range of between about 0.025 millimeters (about 0.001 inches) to about 6.5 millimeters (about 0.25 inches), although the laser-induced seal width (25) can be lesser or greater depending upon the application.

Further, the laser-induced seal (4) generated by the laser beam (22) can have any of a numerous and wide variety of laser-induced seal lengths (24), whereby the laser-induced seal length (24) is sufficient to allow the laser-induced seal (4) to provide a fluid-tight engagement between the first and second layers (2)(3).

As to particular embodiments whereby the concentrically disposed first and second conduits (10)(11) have a generally circular cross section, the laser-induced seal length (24) can span generally the entirety of the circumference (about 360 degrees) of the concentrically disposed first and second conduits (10)(11). Said another way, the laser-induced seal length (24) can completely surround the concentrically disposed first and second conduits (10)(11).

As to other particular embodiments whereby the concentrically disposed first and second conduits (10)(11) have a generally circular cross section, the laser-induced seal length (24) can span less than the entirety of the circumference of the concentrically disposed first and second conduits (10)(11). Said another way, the laser-induced seal length (24) can only partially surround the concentrically disposed first and second conduits (10)(11).

Typically, but not necessarily, relatively smaller conduits (10)(11) having lesser conduit wall thicknesses (19) and/or lesser conduit passageway diameters (20) require exposure to a laser beam (22) having lesser power and a lesser rate of travel to generate a laser-induced seal (4) which provides a fluid-tight engagement of the conduits (10)(11) in relation to relatively larger conduits (10)(11) having greater conduit wall thicknesses (19) and/or greater conduit passageway diameters (20), which require exposure to a laser beam (22) having greater power and a greater rate of travel.

Further, typically but not necessarily, relatively smaller conduits (10)(11) having lesser conduit wall thicknesses (19) and/or lesser conduit passageway diameters (20) require lesser laser-induced seal widths (25) to provide a fluid-tight engagement between the first and second layers (2)(3) in relation to relatively larger conduits (10)(11) having greater conduit wall thicknesses (19) and/or greater conduit passageway diameters (20), which require greater laser-induced seal widths (25).

As a first illustrative example, to generate a laser-induced seal (4) which provides a fluid-tight engagement of conduits (10)(11) each having a conduit wall thicknesses (19) of about 0.002 inches and a conduit passageway diameter (20) of about 0.0073 inches, a laser beam (22) having a power of about 10 Watts and a rate of travel of about 0.005 inches per second to about 1 inch per second can be used, whereby the laser-induced seal (4) generated can have a laser-induced seal width (25) of about 0.001 inches to about 0.003 inches.

As a second illustrative example, to generate a laser-induced seal (4) which provides a fluid-tight engagement of conduits (10)(11) each having a conduit wall thicknesses (19) of about 0.0625 inches and a conduit passageway diameter (20) of about 0.50 inches, a laser beam (22) having a power of about 60 Watts and a rate of travel of about 0.05 inches per second to about 2 inch per second can be used, whereby the laser-induced seal (4) generated can have a laser-induced seal width (25) of about 0.005 inches to about 0.1875 inches.

As a third illustrative example, to generate a laser-induced seal (4) which provides a fluid-tight engagement of conduits (10)(11) each having a conduit wall thicknesses (19) of about 0.25 inches and a conduit passageway diameter (20) of about 4 inches, a laser beam (22) having a power of about 120 Watts and a rate of travel of about 0.05 inches per second to about 2 inch per second can be used, whereby the laser-induced seal (4) generated can have a laser-induced seal width (25) of about 0.005 inches to about 0.25 inches.

As to particular embodiments, the laser beam (22) can function to combine, whether partially or completely, the first and second materials (5)(6) to generate the laser-induced seal (4).

As to particular embodiments, the laser beam (22) can function to fuse, whether partially or completely, the first and second materials (5)(6) to generate the laser-induced seal (4).

For the purposes of the present invention, the term "fuse" means to blend or join by or as if by melting together.

Now referring primarily to FIG. 8 through FIG. 11, as to particular embodiments, the laser-induced seal (4) can be apparent (or evident), meaning that the laser-induced seal (4) can be distinguished from its surroundings, and namely from the second layer external surface (23) or the second conduit external surface (13), via one or more distinguishing properties. In this way, the laser-induced seal (4) can be identified, for example via visual identification, tactile identification, or via other means of identification, thereby confirming that the laser-induced seal (4) has been generated to provide a fluid-tight engagement between first and second layers (2)(3), such as first and second conduits (10)(11).

Figure 1:
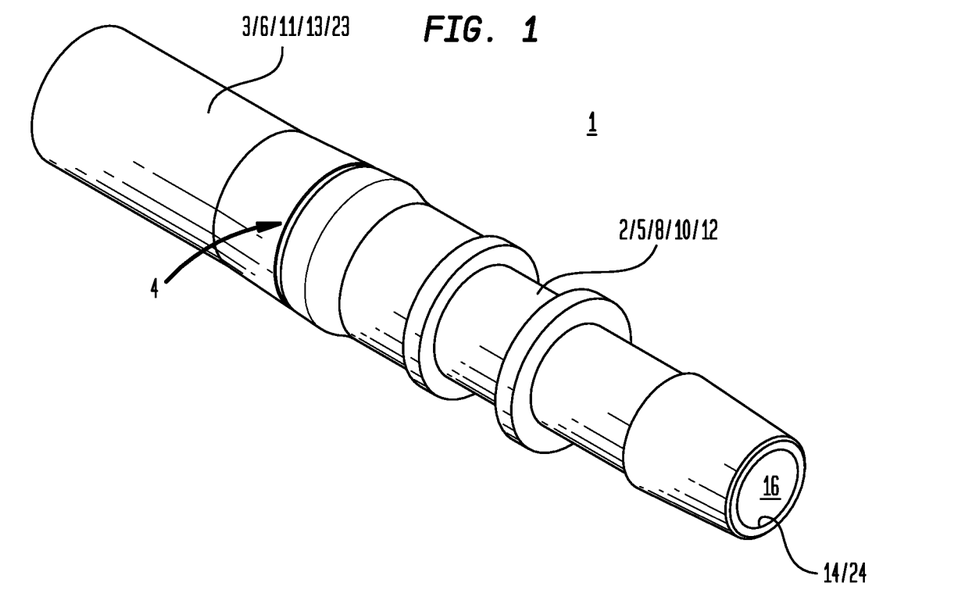
FIG. 1 is a perspective view of a particular embodiment of a connection having a laser-induced seal.
Figure 2:
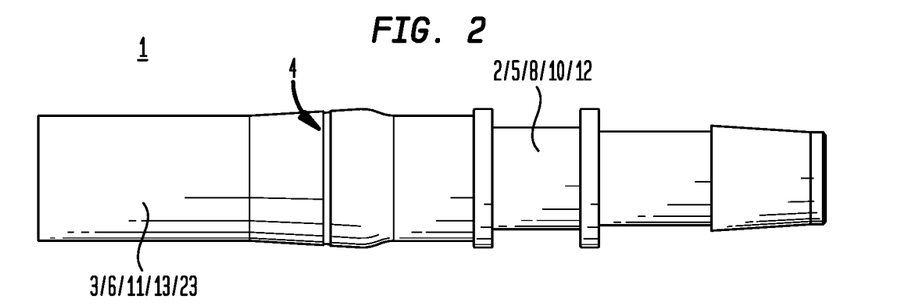
FIG. 2 is a front view of the connection shown in FIG. 1.
Figure 3:
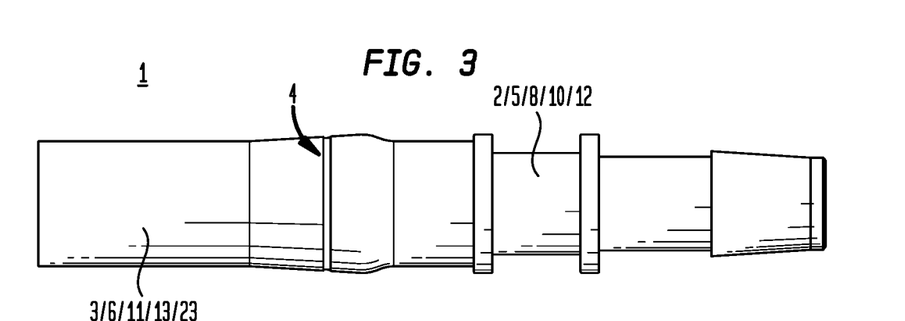
FIG. 3 is a rear view of the connection shown in FIG. 1.
Figure 4:
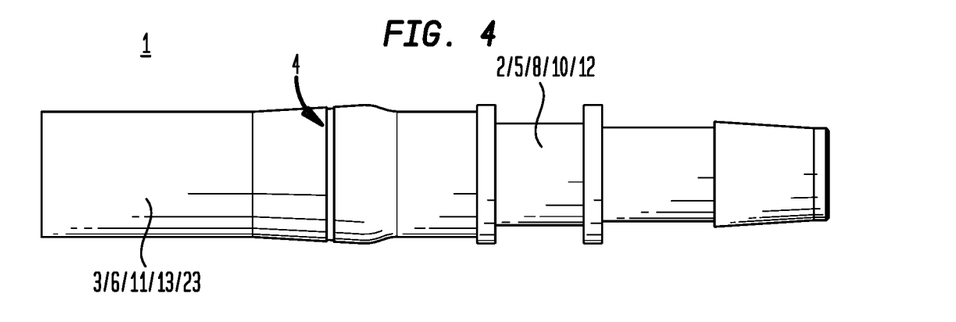
FIG. 4 is a top view of the connection shown in FIG. 1.
Figure 5:
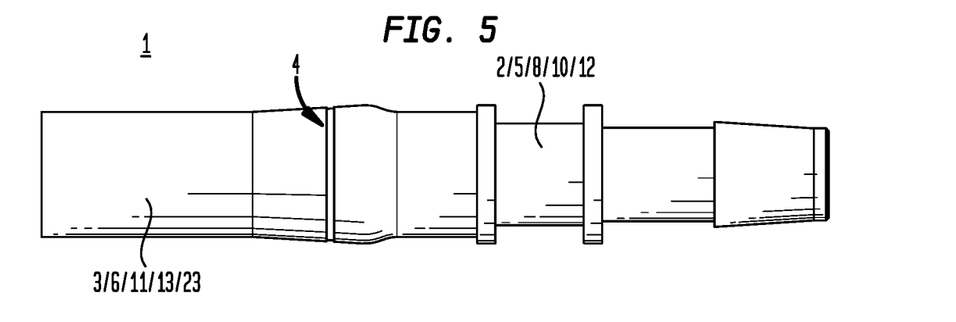
FIG. 5 is a bottom view of the connection shown in FIG. 1.
Figure 6:
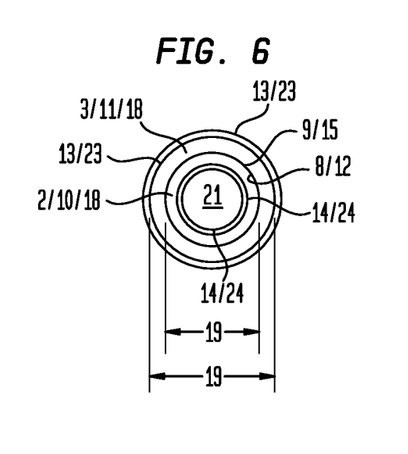
FIG. 6 is a first end view of the connection shown in FIG. 1.
Figure 7:
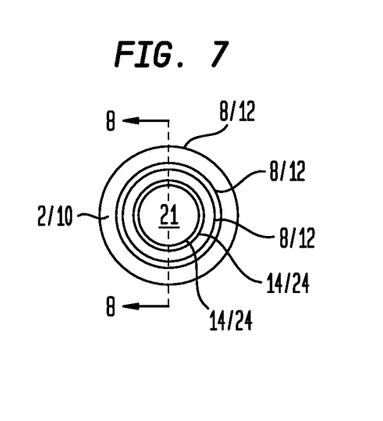
FIG. 7 is a second end view of the connection shown in FIG. 1.
Figure 8:
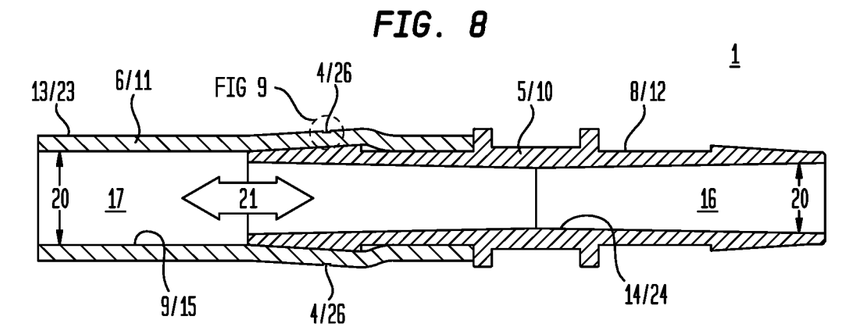
FIG. 8 is a cross-sectional view 8-8 of the connection shown in FIG. 7, whereby a laser-induced seal of the connection can comprise or can be apparent (or evident) as a recess which inwardly extends from a second conduit external surface.
Figure 9:
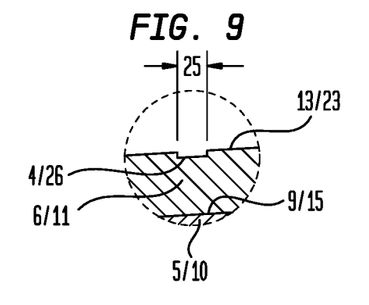
FIG. 9 is an enlarged view of a portion of the connection shown in FIG. 8.

Now referring primarily to FIG. 8 and FIG. 9, as to one particular embodiment, the laser-induced seal (4) can comprise or can be apparent (or evident) as a recess (26) which inwardly extends from the second layer external surface (23) or the second conduit external surface (13), whereby the recess (26) is provided upon generation of the laser-induced seal (4). Accordingly, the recess (26) can be seen or felt by an individual viewing or touching the second conduit external surface (13) proximate the laser-induced seal (4).

Figure 10:
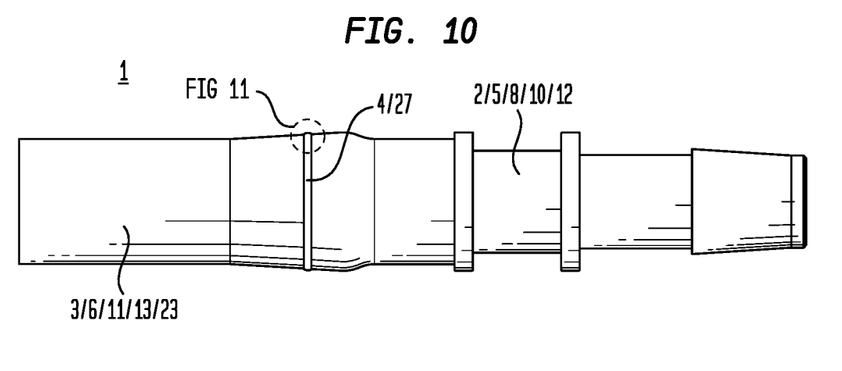
FIG. 10 is a front view of a particular embodiment of a connection having a laser-induced seal, whereby a laser-induced seal of the connection can comprise or can be apparent (or evident) as a protrusion which outwardly extends from a second conduit external surface.
Figure 11:
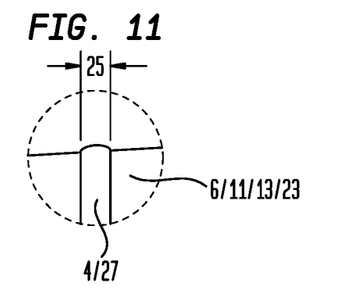
FIG. 11 is an enlarged view of a portion of the connection shown in FIG. 10.

Now referring primarily to FIG. 10 and FIG. 11, as to another particular embodiment, the laser-induced seal (4) can comprise or can be apparent (or evident) as a protrusion (27) which outwardly extends from the second layer external surface (23) or the second conduit external surface (13), whereby the protrusion (27) is provided upon generation of the laser-induced seal (4). Accordingly, the protrusion (27) can be seen or felt by an individual viewing or touching the second conduit external surface (13) proximate the laser-induced seal (4).

Figure 12:
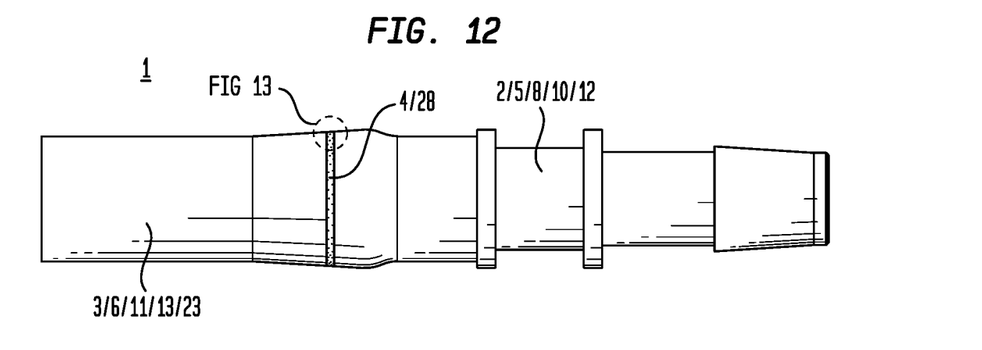
FIG. 12 is a front view of a particular embodiment of a connection having a laser-induced seal, whereby a laser-induced seal of the connection can comprise or can be apparent (or evident) as a colored indicium on a second conduit external surface.
Figure 13:
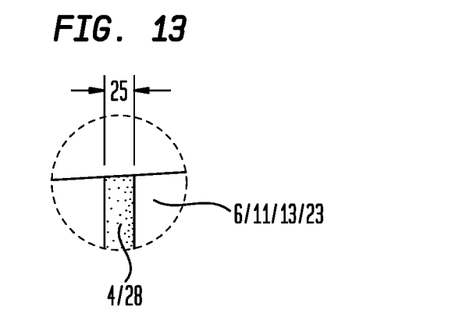
FIG. 13 is an enlarged view of a portion of the connection shown in FIG. 12.
Figure 14:
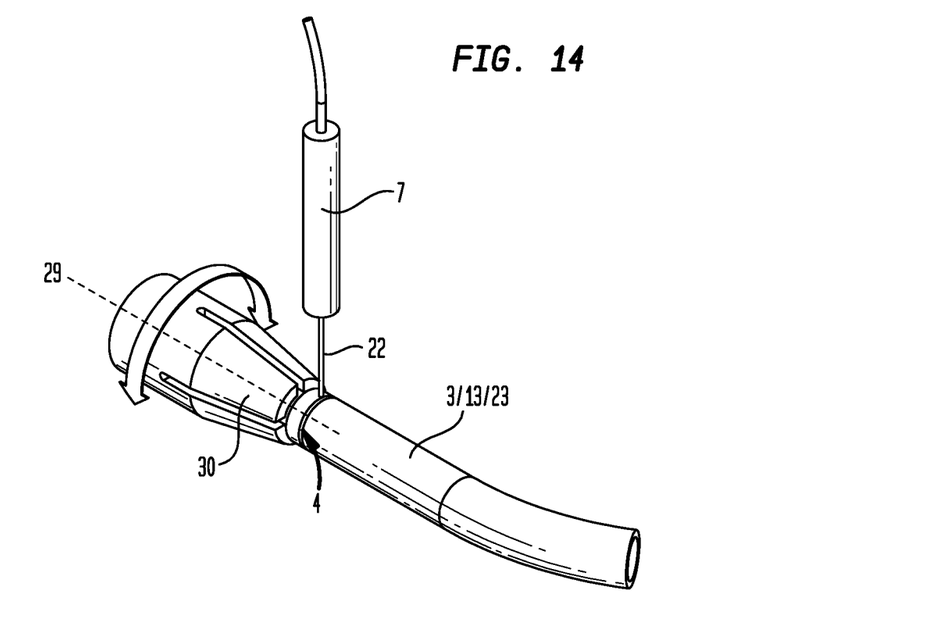
FIG. 14 is an illustration of a method of making a laser-induced seal between first and second layers by rotating concentrically disposed first and second conduits about a rotation axis while a fixed laser beam is incident upon portions of the first and second conduits which are to be sealed by the laser-induced seal.
Figure 15:
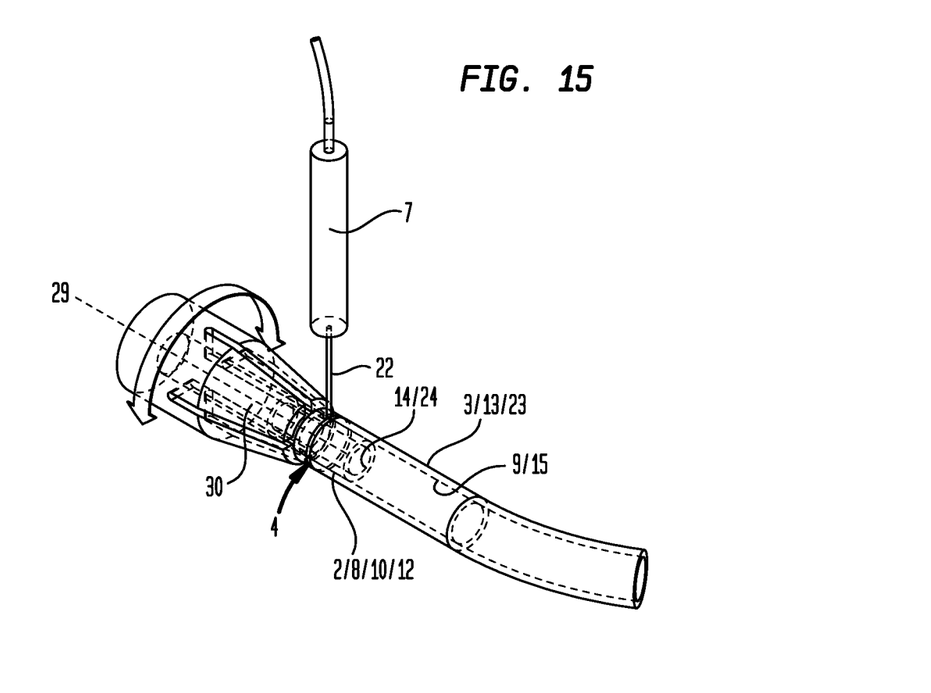
FIG. 15 is an illustration of the method of making the laser-induced seal between first and second layers shown in FIG. 14.
Figure 16:
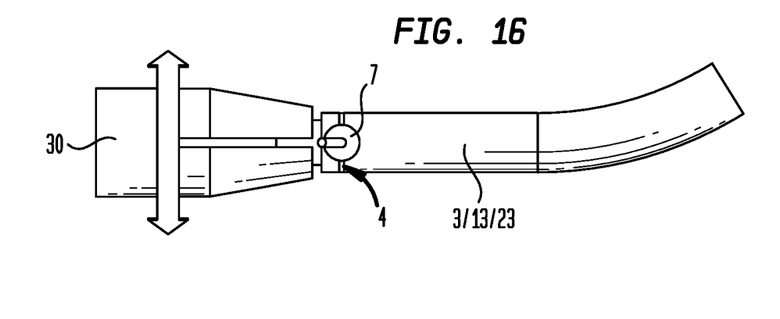
FIG. 16 is an illustration of the method of making the laser-induced seal between first and second layers shown in FIG. 14.
Figure 17:
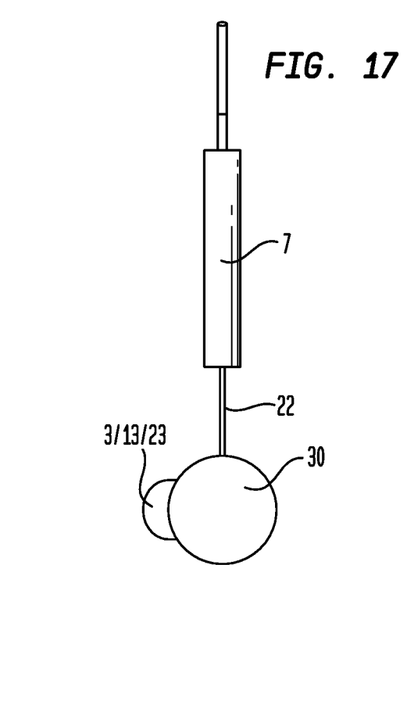
FIG. 17 is an illustration of the method of making the laser-induced seal between first and second layers shown in FIG. 14.
Figure 18:
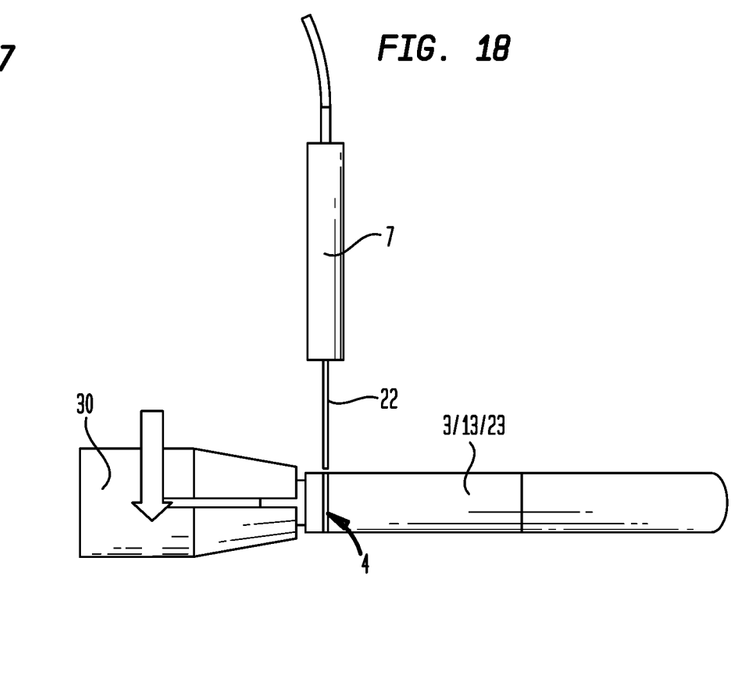
FIG. 18 is an illustration of the method of making the laser-induced seal between first and second layers shown in FIG. 14.
Figure 19:
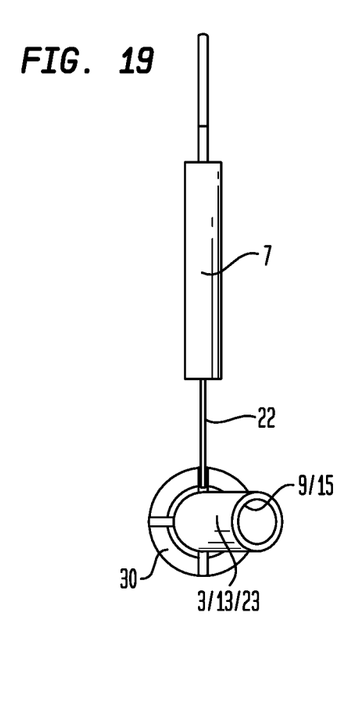
FIG. 19 is an illustration of the method of making the laser-induced seal between first and second layers shown in FIG. 14.
Figure 20:
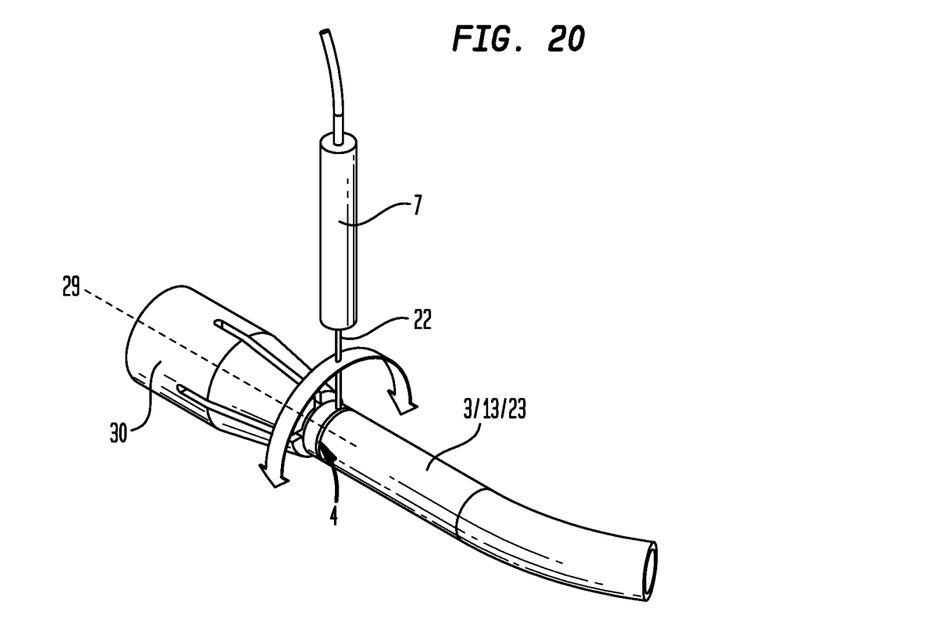
FIG. 20 is an illustration of a method of making a laser-induced seal between first and second layers by rotating a rotatable laser beam about a rotation axis and about concentrically disposed first and second conduits which are fixedly positioned about the rotation axis such that the rotating laser beam is incident upon portions of the first and second conduits which are to be sealed by the laser-induced seal.
Figure 21:
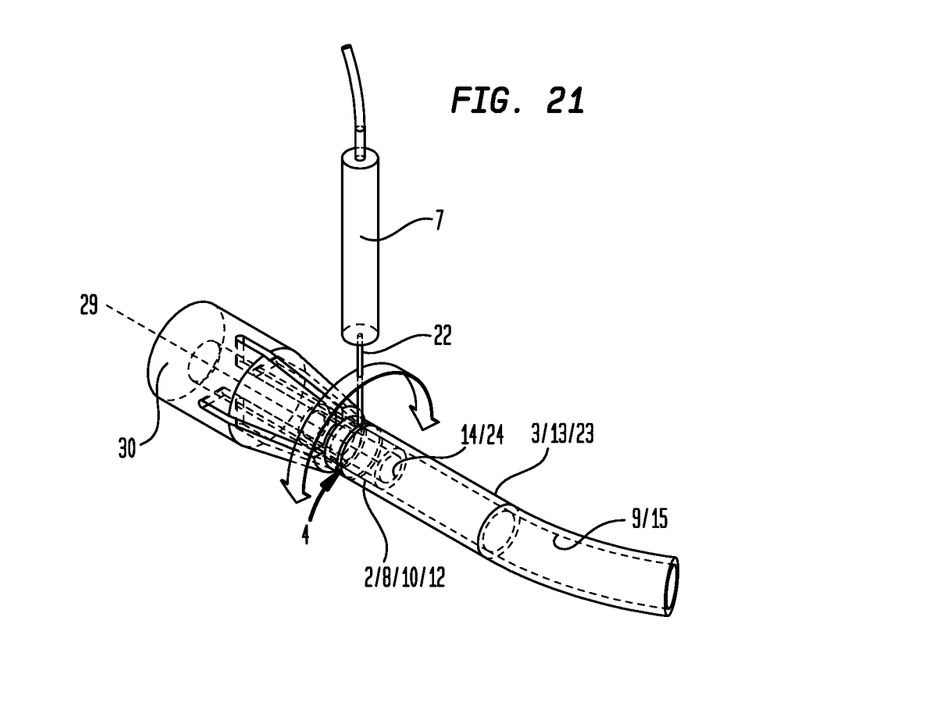
FIG. 21 is an illustration of the method of making the laser-induced seal between first and second layers shown in FIG. 20.
Figure 22:
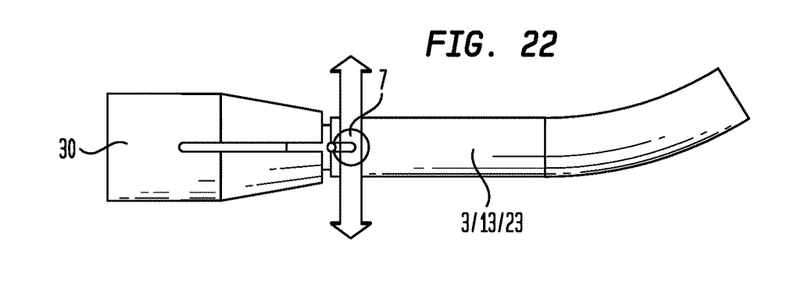
FIG. 22 is an illustration of the method of making the laser-induced seal between first and second layers shown in FIG. 20.
Figure 23:
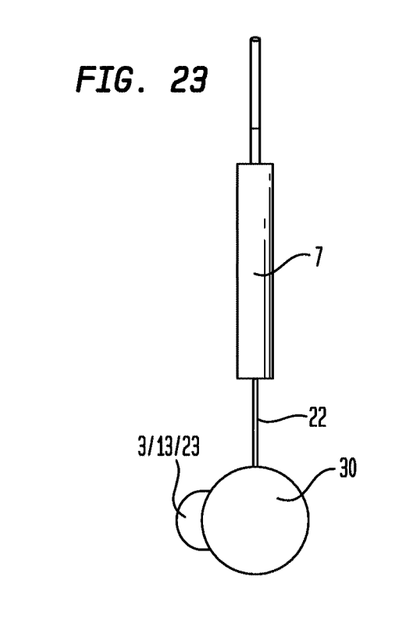
FIG. 23 is an illustration of the method of making the laser-induced seal between first and second layers shown in FIG. 20.
Figure 24:
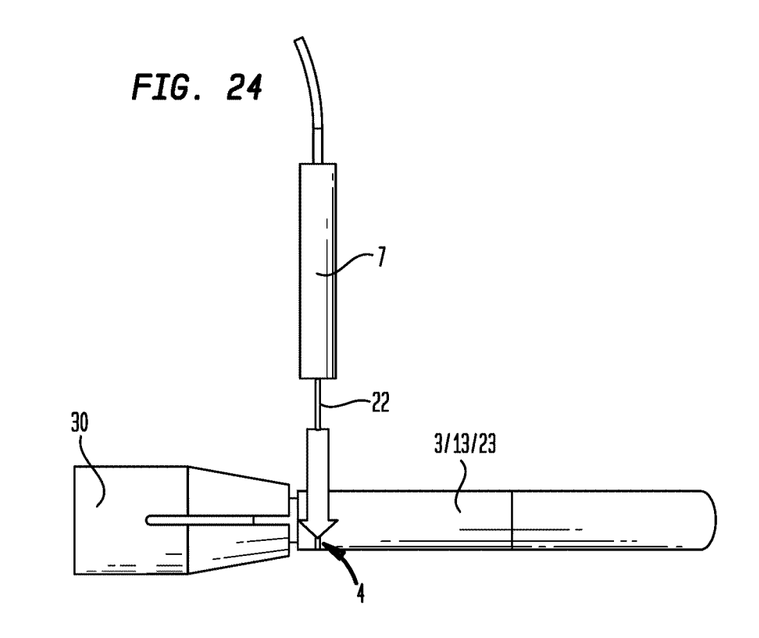
FIG. 24 is an illustration of the method of making the laser-induced seal between first and second layers shown in FIG. 20.
Figure 25:
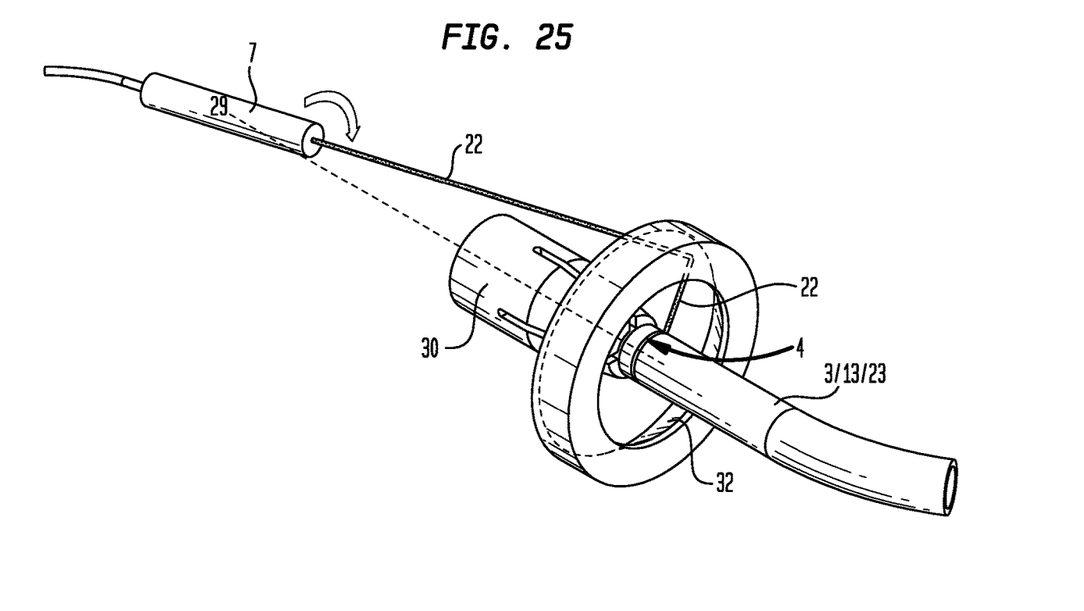
FIG. 25 is an illustration of a method of making a laser-induced seal between first and second layers by rotating a rotatable laser beam about a rotation axis, whereby the laser beam is set at an appropriate angle to reflect off of a mirrored surface which facilitates focusing of the laser beam on concentrically disposed first and second conduits which are fixedly positioned about the rotation axis such that the focused laser beam is incident upon portions of the first and second conduits which are to be sealed by the laser-induced seal.
Figure 26:
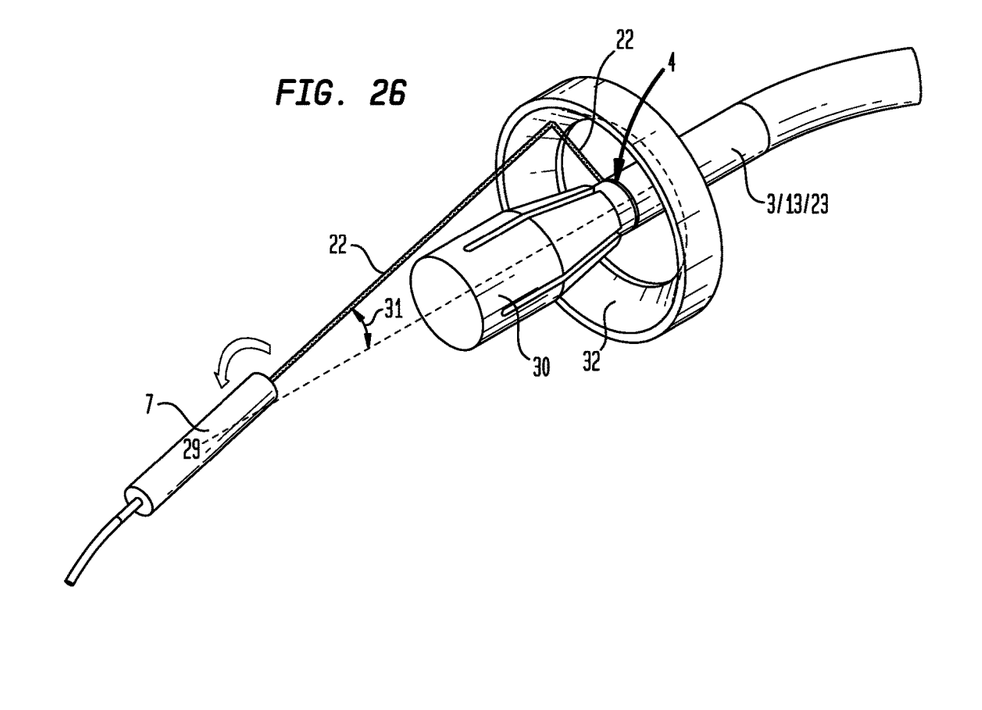
FIG. 26 is an illustration of the method of making the laser-induced seal between first and second layers shown in FIG. 25.
Figure 27:
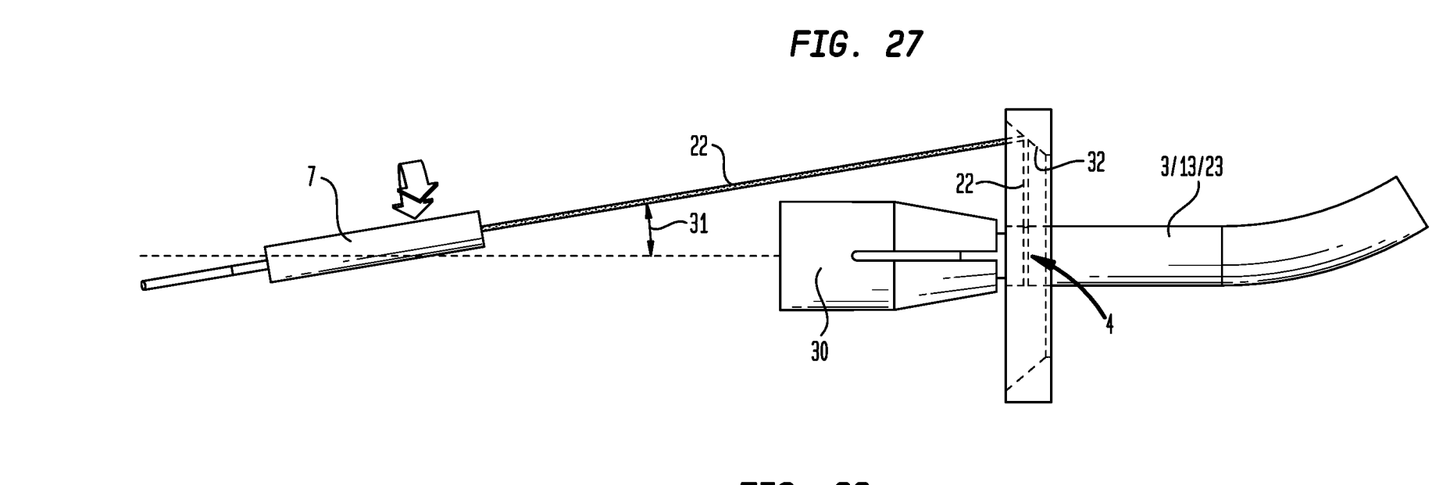
FIG. 27 is an illustration of the method of making the laser-induced seal between first and second layers shown in FIG. 25.
Figure 28:
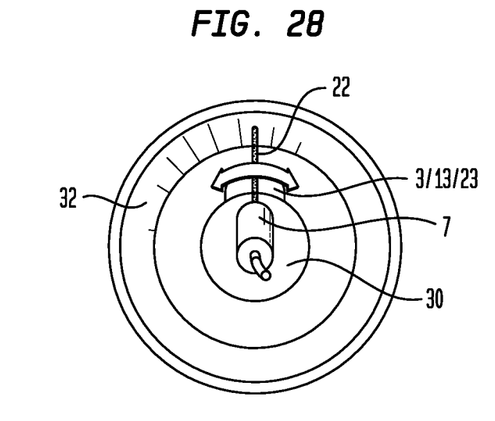
FIG. 28 is an illustration of the method of making the laser-induced seal between first and second layers shown in FIG. 25.

Now referring primarily to FIG. 12 and FIG. 13, as to yet another particular embodiment, the laser-induced seal (4) can comprise or can be apparent (or evident) as a colored indicium (28) having a color which differs from the color of the second conduit (11), whereby the colored indicium (28) is provided upon generation of the laser-induced seal (4). Accordingly, the colored indicium (28) can be seen by an individual viewing the second conduit external surface (13) proximate the laser-induced seal (4).

A method of making a connection (1), as above described, can include providing a first layer (2); concentrically disposing a second layer (3) about the first layer (2); and generating a laser-induced seal (4) between portions of the first and second layers (2)(3), whereby the laser-induced seal (4) provides a fluid-tight engagement between the first and second layers (2)(3).

Now referring primarily to FIG. 14 through FIG. 19, as to particular embodiments, the laser-induced seal (4) between the first and second layers (2)(3), such as first and second conduits (10)(11), can be generated by rotating concentrically disposed first and second conduits (10)(11) about a rotation axis (29) while a fixed laser beam (22) (meaning a laser beam (22) in a fixed position) is incident upon the portions of the first and second conduits (10)(11) which are to be sealed by the laser-induced seal (4).

As but one illustrative example, the concentrically disposed first and second conduits (10)(11) can be engaged with a robotic arm. While a fixed laser beam (22) is incident upon the portions of the first and second conduits (10)(11) which are to be sealed by the laser-induced seal (4), the robotic arm can rotate the concentrically disposed first and second conduits (10)(11) about the rotation axis (29), thereby generating the laser-induced seal (4) between portions of the first and second conduits (10)(11).

As but a second illustrative example, the concentrically disposed first and second conduits (10)(11) can be engaged with a rotatable collet (30). While a fixed laser beam (22) is incident upon the portions of the first and second conduits (10)(11) which are to be sealed by the laser-induced seal (4), the rotatable collet (30) can be rotated to correspondingly rotate the concentrically disposed first and second conduits (10)(11) about the rotation axis (29), thereby generating the laser-induced seal (4) between portions of the first and second conduits (10)(11).

As to particular embodiments whereby the concentrically disposed first and second conduits (10)(11) have a generally circular cross section, the robotic arm or the rotatable collet (30) can rotate the concentrically disposed first and second conduits (10)(11) about 360 degrees; following, the laser-induced seal (4) can span generally the entirety or nearly the entirely of the circumference (about 360 degrees) of the concentrically disposed first and second conduits (10)(11); however, the laser-induced seal (4) need not span generally the entirety or nearly the entirely of the circumference of the concentrically disposed first and second conduits (10)(11), depending upon the application.

Now referring primarily to FIG. 20 through FIG. 24, as to other particular embodiments, the laser-induced seal (4) between the first and second layers (2)(3), such as first and second conduits (10)(11), can be generated by rotating a rotatable laser beam (22) about a rotation axis (29) and about concentrically disposed first and second conduits (10)(11) which are fixedly positioned about the rotation axis (29) such that upon rotation, the rotatable laser beam (22) is incident upon the portions of the first and second conduits (10)(11) which are to be sealed by the laser-induced seal (4).

As but one illustrative example, the rotatable laser beam (22) can be produced by a rotatable laser (7). Accordingly, upon rotation of the rotatable laser (7) about the rotation axis (29), the laser beam (22) can correspondingly be rotated about concentrically disposed first and second conduits (10)(11) which are fixedly positioned about the rotation axis (29) such that the rotating laser beam (22) is incident upon the portions of the first and second conduits (10)(11) which are to be sealed by the laser-induced seal (4).

As to particular embodiments whereby the concentrically disposed first and second conduits (10)(11) have a generally circular cross section, the rotatable laser beam (22) can be rotated about 360 degrees; following, the laser-induced seal (4) can span generally the entirety or nearly the entirely of the circumference (about 360 degrees) of the concentrically disposed first and second conduits (10)(11); however, the laser-induced seal (4) need not span generally the entirety or nearly the entirely of the circumference of the concentrically disposed first and second conduits (10)(11), depending upon the application.

Now referring primarily to FIG. 25 through FIG. 28, as to yet other particular embodiments, the laser-induced seal (4) between the first and second layers (2)(3), such as first and second conduits (10)(11), can be generated by rotating a rotatable laser beam (22) about a rotation axis (29), whereby the laser beam (22) is set at an appropriate or desired angle (31) to reflect off of a mirrored surface (32) which facilitates focusing of the laser beam (22) on concentrically disposed first and second conduits (10)(11) which are fixedly positioned about the rotation axis (29) such that the focused laser beam (22) is incident upon the portions of the first and second conduits (10)(11) which are to be sealed by the laser-induced seal (4).

As but one illustrative example, the mirrored surface (32) can be a concave toroidal mirrored surface (32) which, when the rotatable laser beam (22) is set at an appropriate or desired angle (31) to reflect off of the concave toroidal mirrored surface (32), facilitates focusing of the laser beam (22) on concentrically disposed first and second conduits (10)(11) which are fixedly positioned about the rotation axis (29) such that the focused laser beam (22) is incident upon the portions of the first and second conduits (10)(11) which are to be sealed by the laser-induced seal (4).

As to particular embodiments whereby the concentrically disposed first and second conduits (10)(11) have a generally circular cross section, the rotatable laser beam (22) can be rotated about 360 degrees; following, the laser-induced seal (4) can span generally the entirety or nearly the entirely of the circumference (about 360 degrees) of the concentrically disposed first and second conduits (10)(11); however, the laser-induced seal (4) need not span generally the entirety or nearly the entirely of the circumference of the concentrically disposed first and second conduits (10)(11), depending upon the application.

As to still yet other particular embodiments, the laser-induced seal (4) between the first and second layers (2)(3), such as first and second conduits (10)(11), can be generated by a circular laser beam (22) which is set at an appropriate or desired angle (31) to reflect off of a mirrored surface (32) which facilitates focusing of the circular laser beam (22) on concentrically disposed first and second conduits (10)(11) which are fixedly positioned such that the focused laser beam (22) is incident upon the portions of the first and second conduits (10)(11) which are to be sealed by the laser-induced seal (4) (not shown).

As can be easily understood from the foregoing, the basic concepts of the present invention may be embodied in a variety of ways. The invention involves numerous and varied embodiments of a laser-induced seal of concentrically-layered materials and methods for making and using such a laser-induced seal of concentrically-layered materials, including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "seal" should be understood to encompass disclosure of the act of "sealing"—whether explicitly discussed or not—and, conversely, were there effectively disclosure of the act of "sealing", such a disclosure should be understood to encompass disclosure of a "seal" and even a "means for sealing". Such alternative terms for each element or step are to be understood to be explicitly included in the description.

In addition, as to each term used it should be understood that unless its utilization in this application is inconsistent with such interpretation, common dictionary definitions should be understood to included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the laser-induced seals of concentrically-layered materials herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

The invention claimed is:

1. A method of making a connection, comprising:
providing a first layer;
concentrically disposing a second layer about said first layer;
generating a laser-induced seal between portions of said first and second layers;
wherein said laser-induced seal provides a fluid-tight engagement between said first and second layers; and
configuring said laser-induced seal as a recess which inwardly extends from a second layer external surface of said second layer.

2. The method of claim 1, wherein said first and second layers are formed from corresponding first and second materials selected from the group consisting of: a thermoplastic elastomer, polypropylene, polypropylene derivatives, polyethylene, polyethylene derivatives, polyolefin elastomer, polyvinylidene fluoride, polycarbonate, and acrylonitrile butadiene styrene.

3. The method of claim 2, further comprising combining said first and second materials to generate said laser-induced seal.

4. The method of claim 3, further comprising fusing said first and second materials to generate said laser-induced seal.

5. The method of claim 1, further comprising concentrically disposing said second layer about said first layer to position a portion of a first layer external surface of said first layer adjacent to a portion of a second layer internal surface of said second layer.

6. The method of claim 1, further comprising generating said laser-induced seal between at least a first layer external surface of said first layer and a second layer internal surface of said second layer.

7. The method of claim 1, wherein said first layer is incorporated into a first conduit and said second layer is incorporated into a second conduit.

8. The method of claim 1, wherein said laser-induced seal is distinguishable from said second layer external surface.

9. A method of making a connection, comprising:
providing a first layer;
concentrically disposing a second layer about said first layer;
generating a laser-induced seal between portions of said first and second layers;
wherein said laser-induced seal provides a fluid-tight engagement between said first and second layers; and
configuring said laser-induced seal to comprise a protrusion which outwardly extends from a second layer external surface of said second layer, said protrusion resulting from generation of said laser-induced seal.

10. The method of claim 9, wherein said first and second layers are formed from corresponding first and second materials selected from the group consisting of: a thermoplastic elastomer, polypropylene, polypropylene derivatives, polyethylene, polyethylene derivatives, polyolefin elastomer, polyvinylidene fluoride, polycarbonate, and acrylonitrile butadiene styrene.

11. The method of claim 10, further comprising combining said first and second materials to generate said laser-induced seal.

12. The method of claim 11, further comprising fusing said first and second materials to generate said laser-induced seal.

13. The method of claim 9, further comprising concentrically disposing said second layer about said first layer to position a portion of a first layer external surface of said first layer adjacent to a portion of a second layer internal surface of said second layer.

14. The method of claim 9, further comprising generating said laser-induced seal between at least a first layer external surface of said first layer and a second layer internal surface of said second layer.

15. The method of claim 9, wherein said first layer is incorporated into a first conduit and said second layer is incorporated into a second conduit.

16. The method of claim 9, wherein said laser-induced seal is distinguishable from said second layer external surface.

* * * * *